United States Patent [19]
Kuo

[11] Patent Number: 5,924,937
[45] Date of Patent: Jul. 20, 1999

[54] CLUB

[76] Inventor: Wen-Hai Kuo, No. 536, Sec. 2, Ho-Sheng Rd., Pingtung City, Taiwan

[21] Appl. No.: 08/975,073

[22] Filed: Nov. 20, 1997

[51] Int. Cl.⁶ .................................................. A63B 69/36
[52] U.S. Cl. .............................................. 473/296
[58] Field of Search .................................. 473/296, 316, 473/318, 322, 321, 323; 135/69, 75; 403/109.1, 109.4, 109.8

[56] References Cited

U.S. PATENT DOCUMENTS

| | | | |
|---|---|---|---|
| 2,832,598 | 4/1958 | Strub | 473/296 |
| 3,284,114 | 11/1966 | McCord, Jr. et al. | 473/296 |
| 3,524,646 | 8/1970 | Wheeler | 473/296 |
| 5,282,619 | 2/1994 | Napolitano et al. | 473/296 |

*Primary Examiner*—Steven Wong
*Attorney, Agent, or Firm*—Varndell Legal Group

[57] ABSTRACT

The present invention provides an improved club of the type that includes a main rod 1, an auxiliary rod 2, and an extension rod 3. The engagement between the main rod 1 and the auxiliary rod 2 is facilitated by the threaded collar 11 of the main rod 1 and the threaded sleeve 25 of the auxiliary rod 2. One end of the auxiliary rod 2 is provided with a fastening collar 24 and an expanding socket 21. By the axial movement of the threaded sleeve 25 and the auxiliary rod 2, the length of the auxiliary rod 2 can be adjusted. On the other hand, the junction between the auxiliary rod 2 and the extension rod 3 is provided with zigzag or taper or polygonal shape end with which the extension rod 3 can be fixedly adjusted respect to the auxiliary rod 2. By this arrangement, the overall length of the club can be readily and conveniently adjusted according to the height of the user. On the other hand, when the club is not in use, the main rod 1, auxiliary rod 2, and the extension rod 3 can be readily retracted to each other to reduce the overall length when not in use.

4 Claims, 10 Drawing Sheets

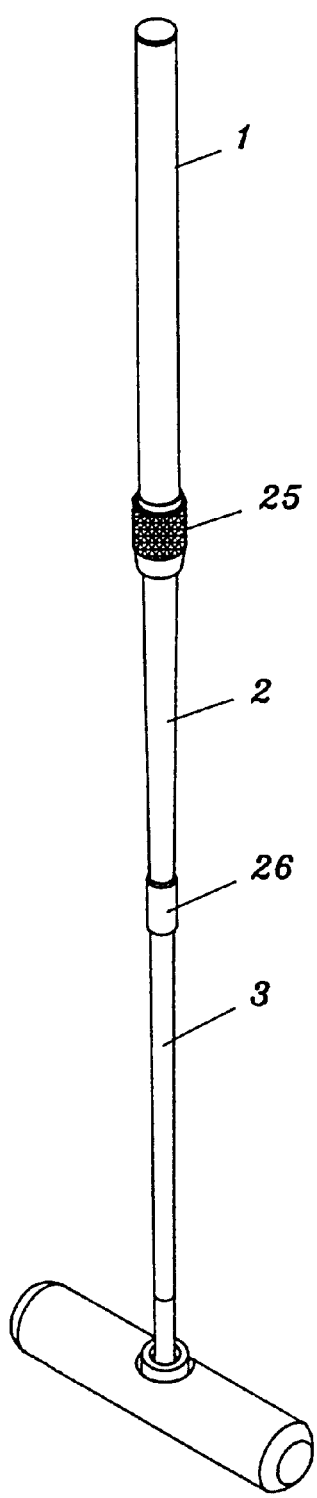
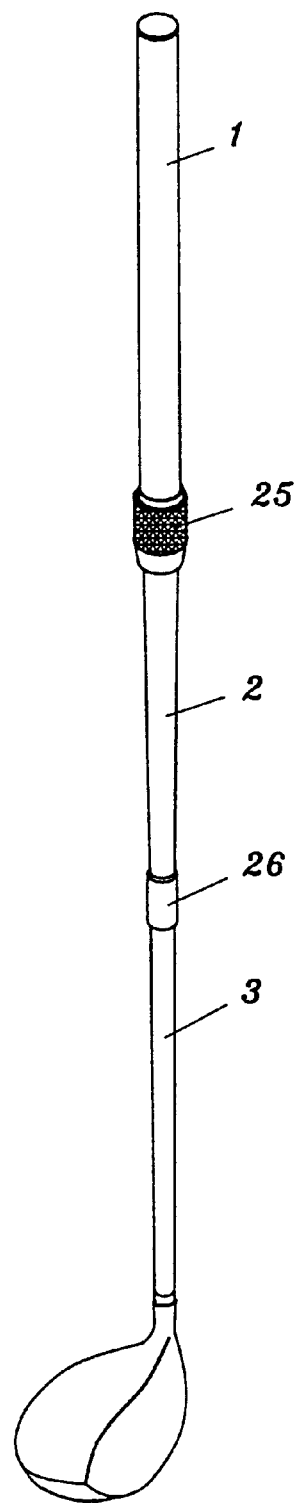
*FIG. 6*  *FIG. 7*

CLUB

FIELD OF THE INVENTION

The present invention relates to a club, more particularly, to an improved club in which the overall length of the club can be readily and conveniently adjusted according to the height of the user. On the other hand, the club can be readily retracted to reduce the overall length when stored.

DESCRIPTION OF PRIOR ART

The golf club or other sport club is integrally formed. The club is long and the club cannot be retracted to reduce its overall length when it is stored. Accordingly, it is really not convenient for the user to keep or bring it. Furthermore, as the length of the club is fixed, it can not be adjusted to meet different requirements for different users.

There are some clubs that can be dissembled when not in use. However, different parts of the clubs are engaged by means of inner/outer threaded portions. The threaded engagement has some defects. Firstly, it takes time in assembly. Secondly, the overall rigidity or strength is reduced, as the threaded portions tend to become loose during use. If the different parts are not firmly engaged, the club can not accurately hit the ball.

SUMMARY OF THE INVENTION

The present invention provides an improved club of the type that includes a main rod 1, an auxiliary rod 2, and an extension rod 3. The engagement between the main rod 1 and the auxiliary rod 2 is facilitated by the threaded collar 11 of the main rod 1 and the threaded sleeve 25 of the auxiliary rod 2. One end of the auxiliary rod 2 is provided with a fastening collar 24 and an expanding socket 21. By the axial movement of the threaded sleeve 25 and the auxiliary rod 2, the length of the auxiliary rod 2 can be adjusted. On the other hand, the junction between the auxiliary rod 2 and the extension rod 3 is provided with zigzag or taper or polygonal shape end with which the extension rod 3 can be fixedly adjusted respect to the auxiliary rod 2. By this arrangement, the overall length of the club can be readily and conveniently adjusted according to the height of the user. On the other hand, when the club is not in use, the main rod 1, auxiliary rod 2, and the extension rod 3 can be readily retracted to each other to reduce the overall length.

BRIEF DESCRIPTION OF DRAWINGS

FIG. 6 is a schematic illustration showing the use of the club made according to the present invention;

FIG. 7 is another schematic illustration showing the use of the club made according to the present invention;

DETAILED DESCRIPTION OF PREFERRED EMBODIMENT

The present invention relates to a club, more particularly, to an improved club in which the overall length of the club can be readily and conveniently adjusted according to the height of the user. On the other hand, the club can be readily retracted to reduce the overall length when stored.

It is still the objective of this invention to provide an improved club to solve the problem encountered by the prior art.

It is still the objective of this invention to provide an improved club that can be readily adjusted for its length to meet different requirements from different user. The improved club features an enhanced rigidity and stability. The improved club can be shortened when not in use.

Figure 1:
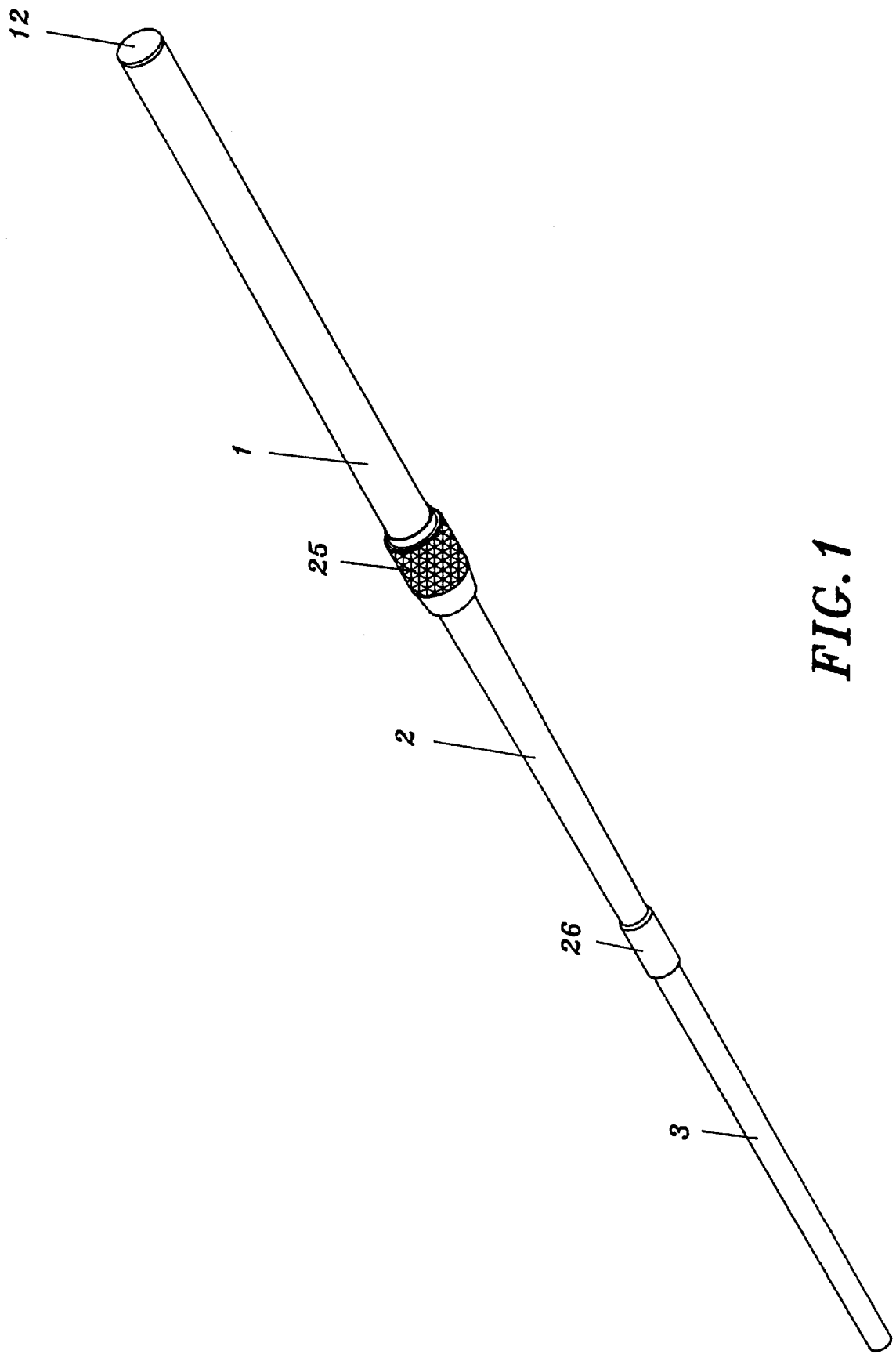
FIG. 1 is a perspective view of the present invention.
Figure 2:
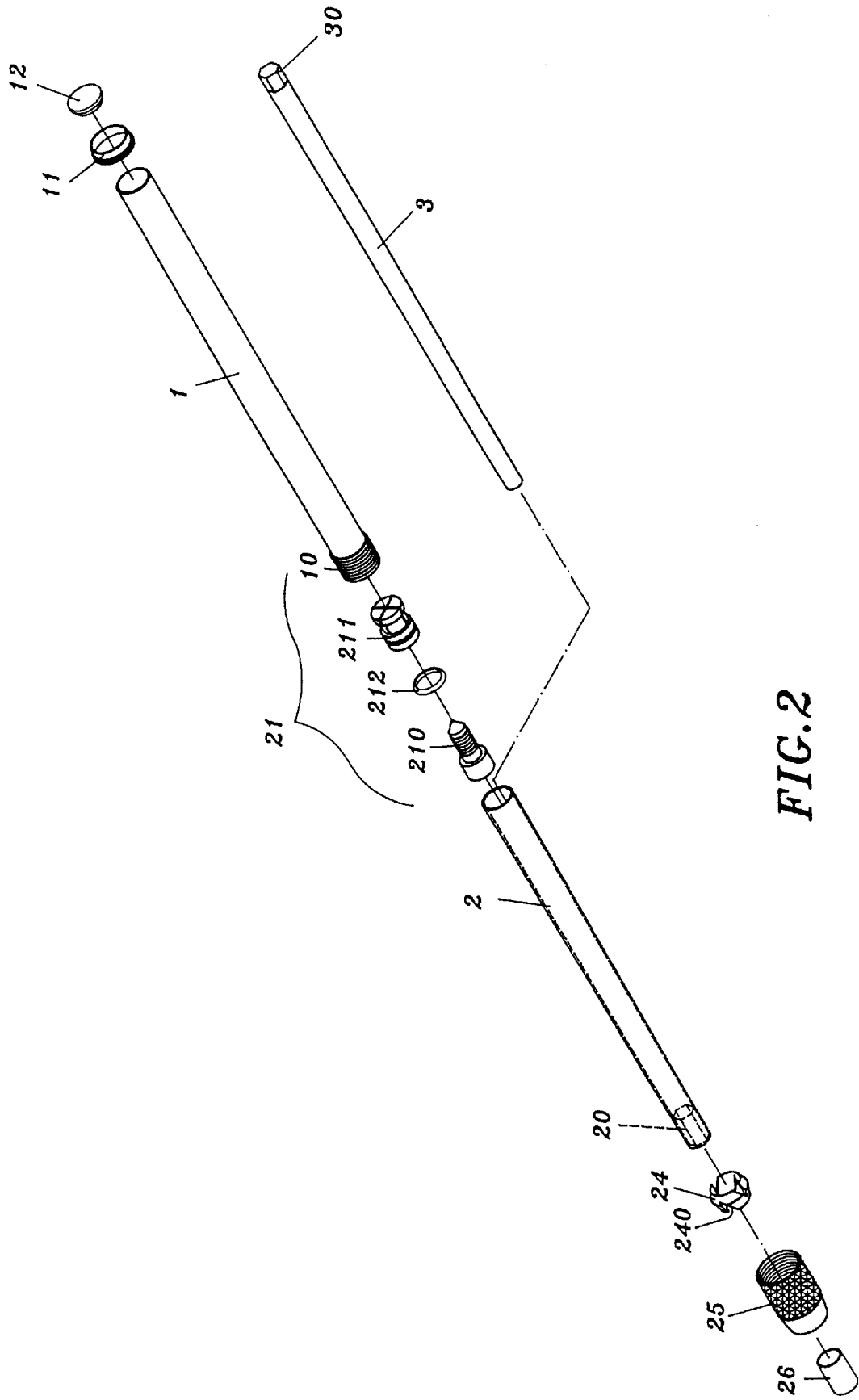
FIG. 2 is an exploded view of the present invention.
Figure 3:
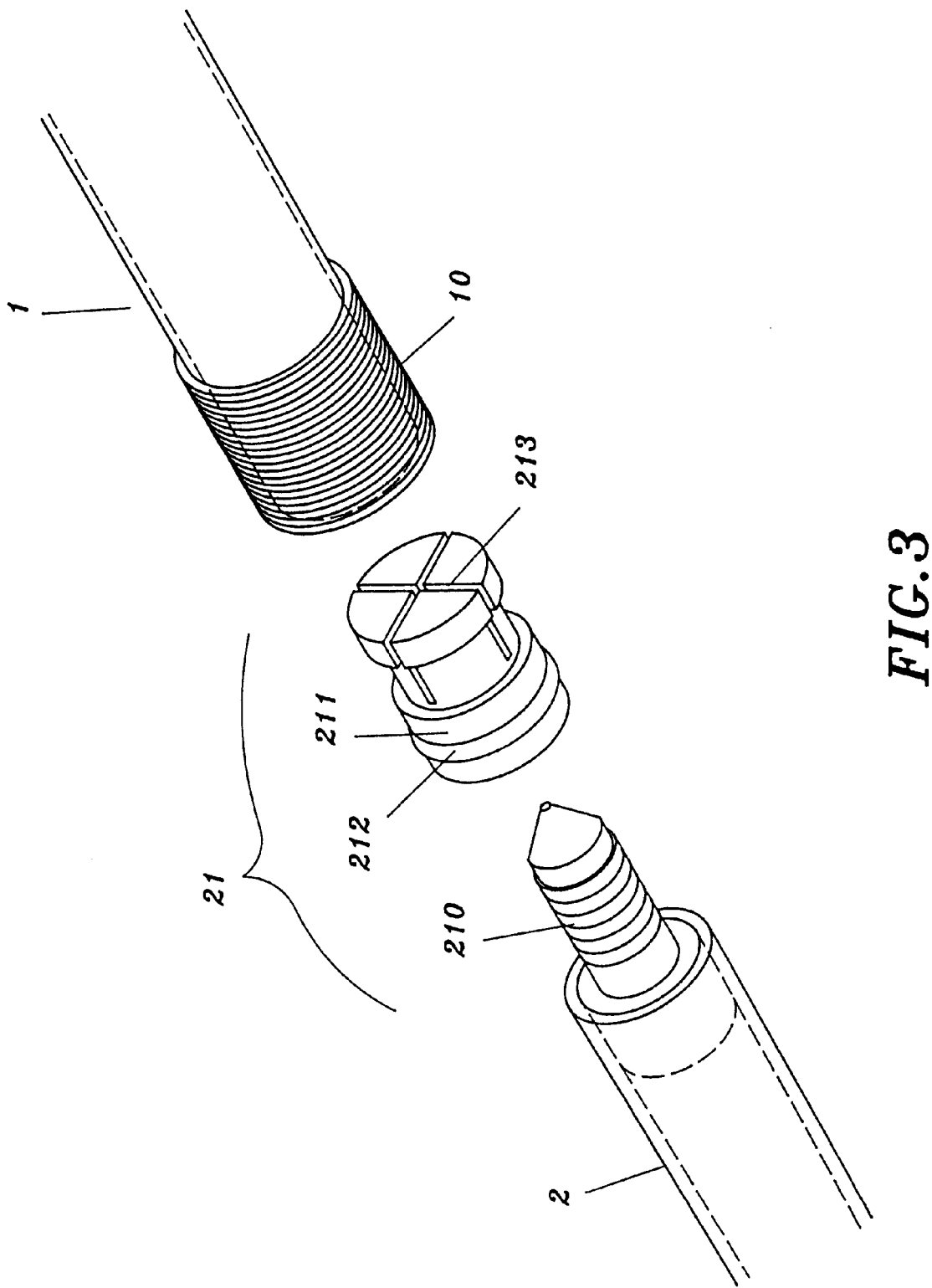
FIG. 3 is an exploded view of the expanding socket.

Referring to FIGS. 1 and 2, the present invention provides an improved club of the type that includes a main rod 1, an auxiliary rod 2, and an extension rod 3. The front end of the main rod 1 is provided with a threaded collar 11 and an end cap 12 is disposed at the rear end of the main rod 1. The auxiliary rod 2 is telescopically disposed within the main rod 1 from the front end. The auxiliary rod 2 has a taper configuration and a positioning portion 20 that has a hexagonal shape. The rear end of the auxiliary rod 2 includes an expanding socket 21 that is configured by a screw head 210, an expanding portion 211, and a protecting ring 212. The screw head 210 of the expanding socket 21 is fixedly disposed on the auxiliary rod 2. The expanding portion 211 includes a plurality of grooves 213, as shown in FIG. 3. The protecting collar 212 is enveloped onto the expanding portion 211. The expanding portion 211 protects the main rod 1 from collapsing when the screw head is tightened. After the screw head 210 is inserted into the expanding portion 211, this subassembly is inserted into the main rod 1.

Figure 4:
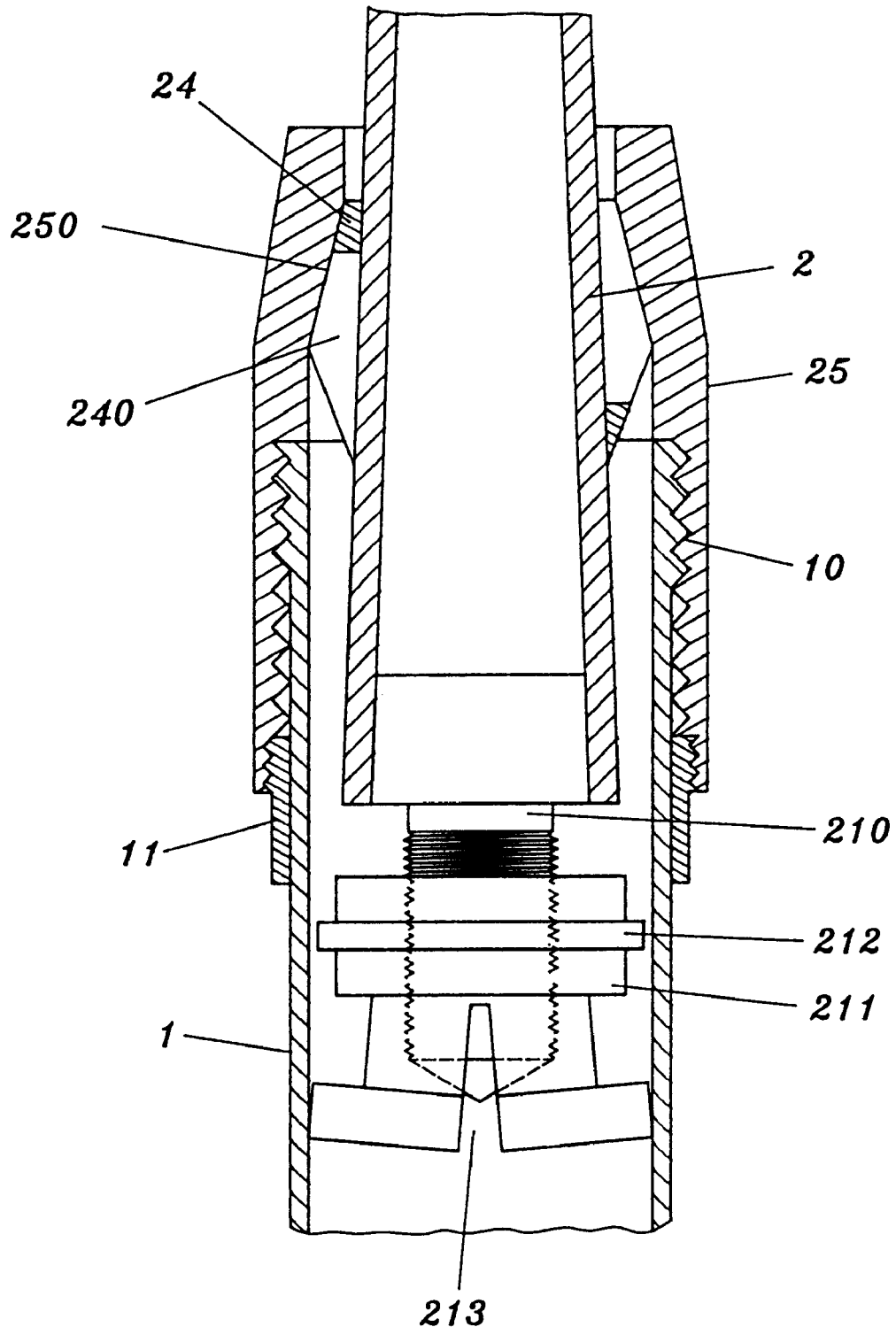
FIG. 4 is a partial, cross sectional view of the present invention.

When the auxiliary rod 2 is rotated such that the screw head 210 is moved axially toward the expanding portion 211, the expanding portion 211 is expanded and grasped toward the inner wall of the main rod 1. As a result, the auxiliary rod 2 is held in position relative to the main rod 1. On the other hand, the front end of the auxiliary rod 2 is disposed with a fastening collar 24 and a threaded sleeve 25 orderly. The fastening collar 24 is disposed within the threaded sleeve 25 and the fastening collar 24 is provided with a plurality of grooves 240. The inner wall of the threaded sleeve 25 includes a taper surface 250, as shown in FIG. 4. The threaded sleeve 25 can engage with the threaded portion 10 of the main rod 1 and further engages with the threaded collar 11 of the main rod 1. As a result, the threaded sleeve 25 is firmly engaged with the threaded collar 11. When the threaded sleeve 25 is rotated, the threaded collar 11 is also rotated simultaneously. By this arrangement, the threaded sleeve 25 will not separate from the main rod 1 and the main rod 1 and the auxiliary rod 2 can be connected.

When the threaded sleeve 25 is rotated and moved to the threaded portion 10 of the main rod 1, the fastening collar 24 will be squeezed by the taper surface 250 of the threaded sleeve 25 and the auxiliary rod 2 will be firmly positioned. The front portion of the auxiliary rod 2 is further fixedly mounted with a protecting sleeve 26 to increase the overall rigidity.

Figure 5:
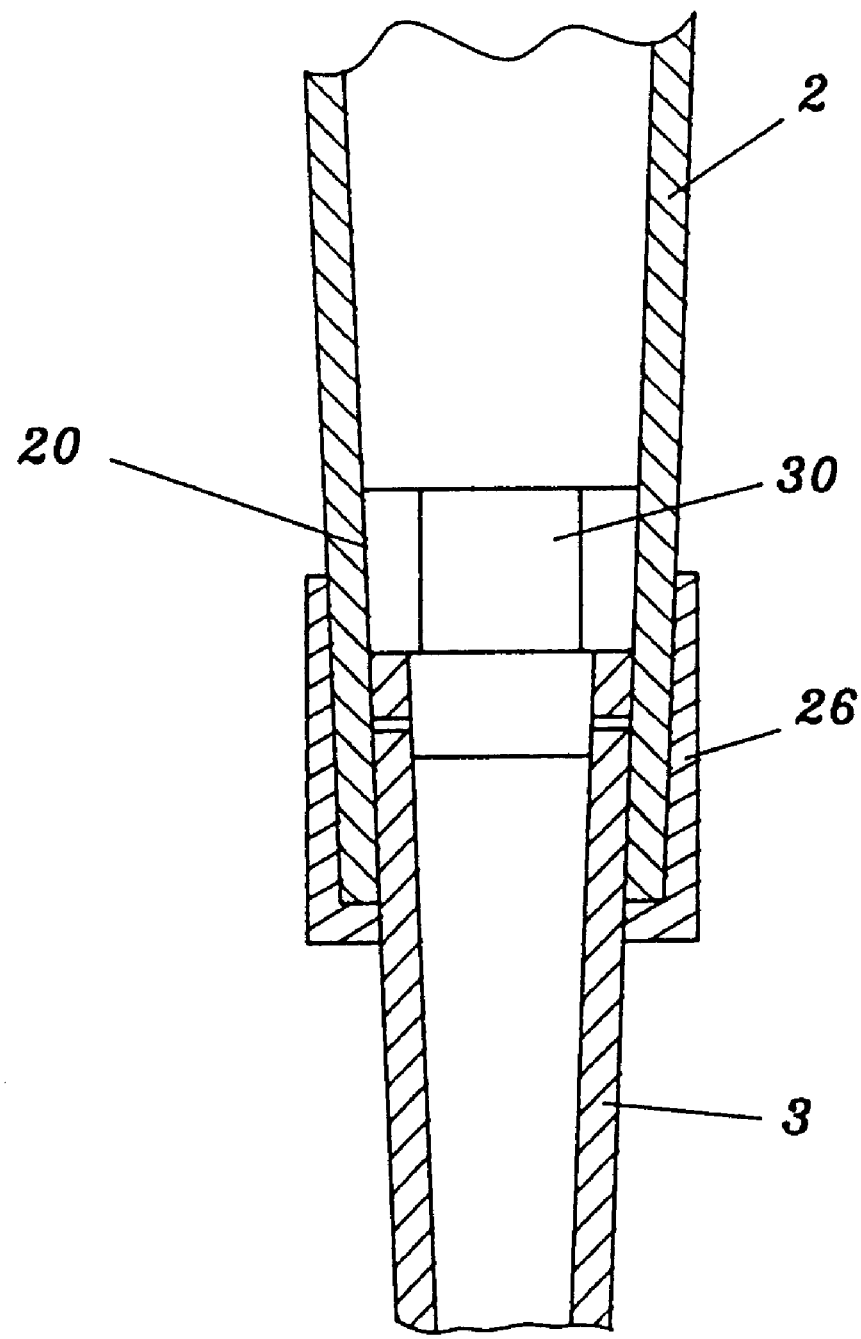
FIG. 5 is a cross sectional view of the junction between the auxiliary rod and the extension rod.

The extension rod 3 is telescopically disposed at the front end of the auxiliary rod 2 and can be completely retracted into the auxiliary rod 2 when not in use. Again the extension rod 3 has a taper configuration. The extension rod 3 includes a connecting portion 30 that can be fixedly fitted with the positioning portion 20 of the auxiliary rod 2. The connection portion 30 has a hexagonal shape also, as shown in FIG. 5. Accordingly, when the extension rod 3 is fully extended, it may receive firm support from the auxiliary rod 2.

From the forgoing description, an improved club suitable for golf is formed, as clearly shown in FIGS. 6 and 7. In use, the threaded sleeve 25 can be loosened such that the fastening collar 24 is released from the taper surface 250 of the threaded sleeve 25. As a result, the auxiliary rod 2 is free to move. Then the auxiliary rod 2 can be rotated such that the screw head 210 is moved away from the expanding portion 211. In this case, the expanding portion 211 is disengaged with the inner wall of the main rod 1. Then the auxiliary rod 2 is free to move inward or outward with respect to the main rod 1.

On the other hand, the extension rod 3 can be pulled outward with respect to the auxiliary rod 2. Then the connecting portion 30 of the extension rod 3 can be engaged with the positioning portion 20 of the auxiliary rod 2. When the extension rod 3 is pulled outward, it can be automatically locked with the auxiliary rod 2 since both have the taper configuration. Because the junction between the auxiliary rod 2 and the extension rod 3 has a hexagonal shape, the extension rod 3 will not rotate with respect to the auxiliary rod 2. In light of this, the user may readily hit the ball with the golf head. A better result can be therefore attained.

On the other hand, the direction of the thread of the screw head 210 is designed to opposite to the golf head attached to the lower end of the improved club. Accordingly, the harder the shot, the stronger the engagement between the auxiliary rod 2 and the main rod 1. By this arrangement, the hitting performance will not be influenced by the loosened engagement between the auxiliary rod 2 and the main rod 1.

Figure 8:
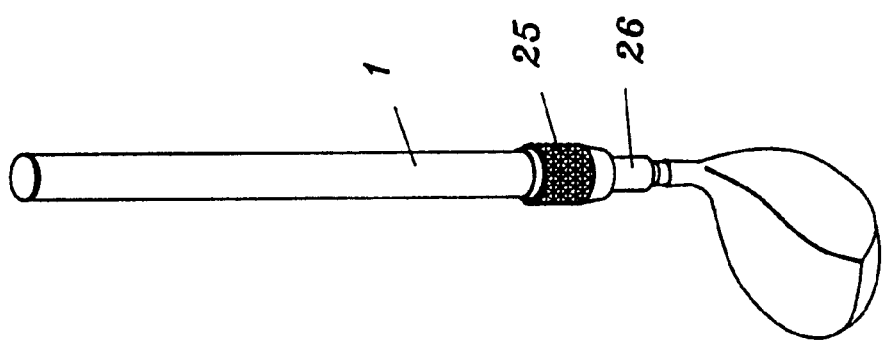
FIG. 8 is a perspective view showing the main rod, auxiliary rod, and the extension rod are retracted respect to each other to reduce the overall length.

When the club is not in use, the extension rod 3 can be directly pushed into the auxiliary rod 2. Then the threaded sleeve 25 is loosened firstly, and then the auxiliary rod 2 is rotated such that the expanding portion 211 will not grasp to the inner wall of the main rod 1. Consequently, the auxiliary rod 2 can be completely retracted into the main rod 1, as shown in FIG. 8. By this arrangement, the overall length of the club when it is stored is just one third of the actual length in use. This compact dimension is readily suitable for carrying and storing. Besides, the extension rod 3 can be designed to have several sections.

Figure 9:
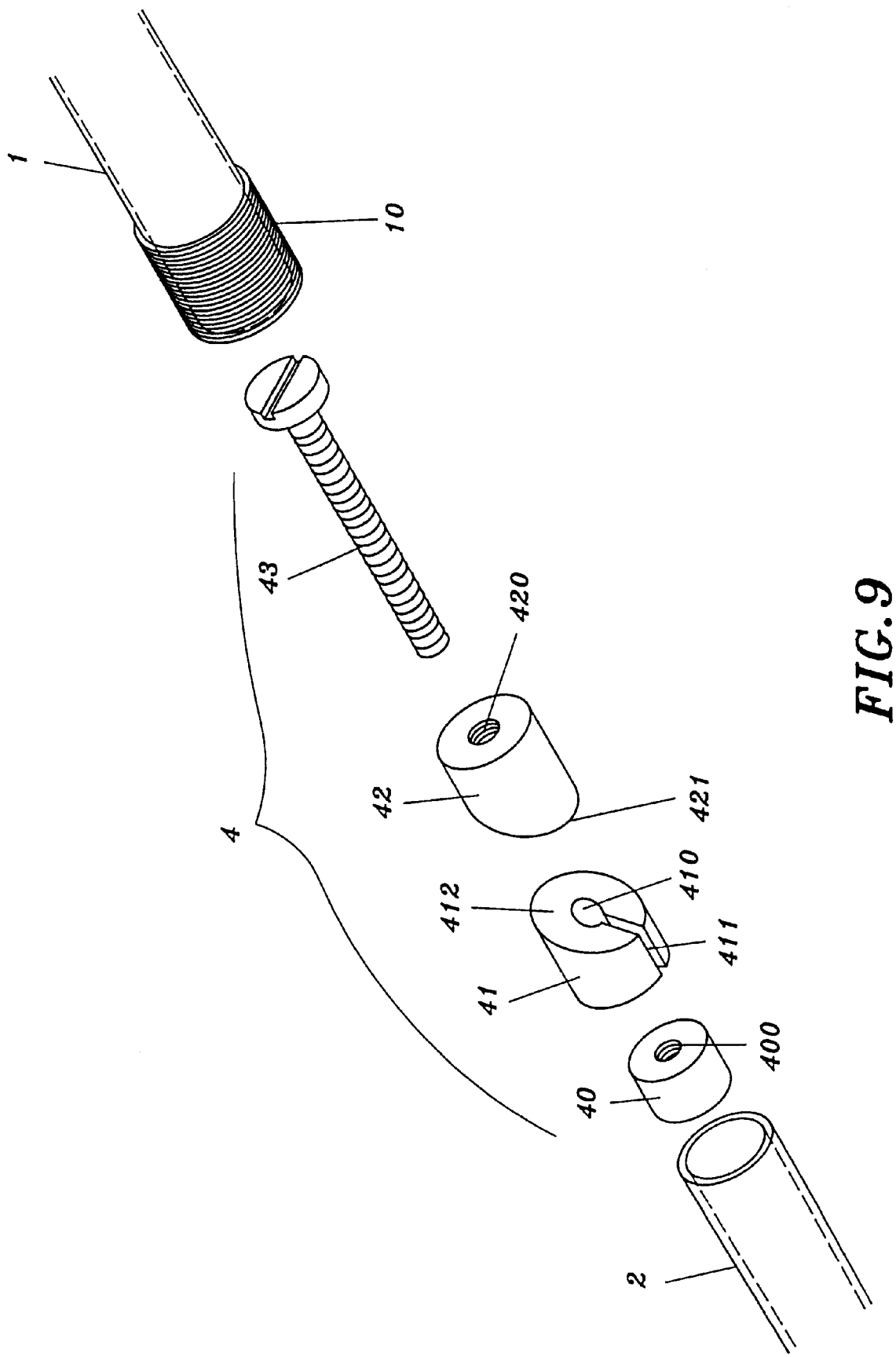
FIG. 9 is an exploded view of a second embodiment of the expanding socket.

As shown in FIG. 9, a second embodiment of the improved club is disclosed. The auxiliary rod 2 includes an expanding socket 4 at rear end. The expanding socket 4 is configured with a fixing socket 40, an expanding element 41, a pressing element 42, and a locking bolt 43. The fixing socket 40 is provided with a threaded hole 400 at central portion. The fixing socket 40 is disposed at the rear end of the auxiliary rod 2. The expanding element 41 is provided with a through hole 410 and a plurality of grooves 411 is passed through the through hole 410. The expanding element 41 is provided with an inclined surface 412 at one side. The pressing body 42 is provided with a threaded hole 420 at center. The pressing body 42 is further provided with an inclined surface 421 corresponding to the inclined surface 412 of the expanding element 41. The locking bolt 43 is firmly locked to the pressing element 42 and reaches to the expanding element 41. Finally, the locking bolt 43 reaches and engages with the fixing socket 40 of the auxiliary rod 2. The sub-assembly configured by the expanding socket 4 and the auxiliary 4 can be inserted into the main rod 1.

When the auxiliary rod 2 is rotated and the locking bolt 43 is moved toward the fixing socket 40, the pressing element 42 could be moved to press the expanding element 41. As a result, the inclined surfaces 421 and 412 will be meshed with each other. As the expanding element 41 is pressed by the pressing element 42, the expanding element 41 will be expanded and grasped to the inner wall of the main rod 1. Consequently, the auxiliary rod 2 is positioned with the main rod 1.

Figure 10:
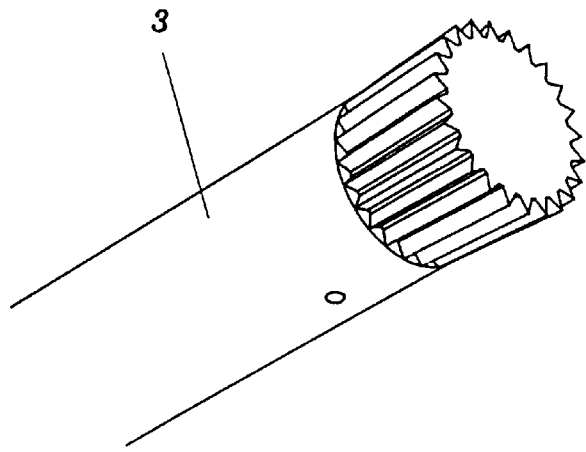
FIG. 10 is an exploded view of a second embodiment of the extension rod.
Figure 11:
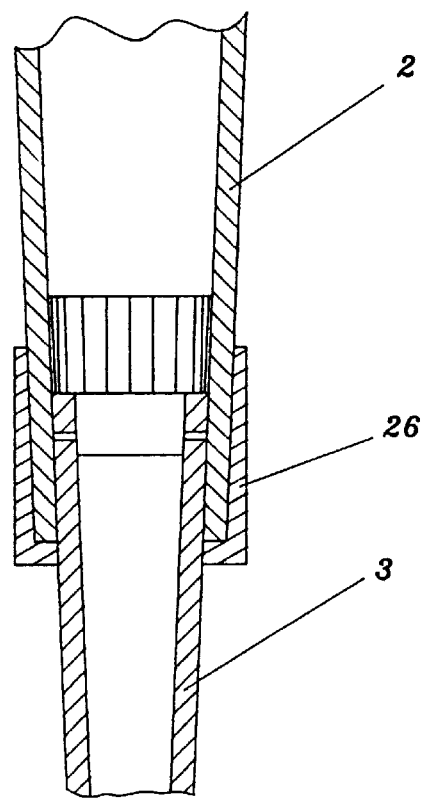
FIG. 11 is a cross sectional view of a second embodiment of the extension rod.
Figure 12:
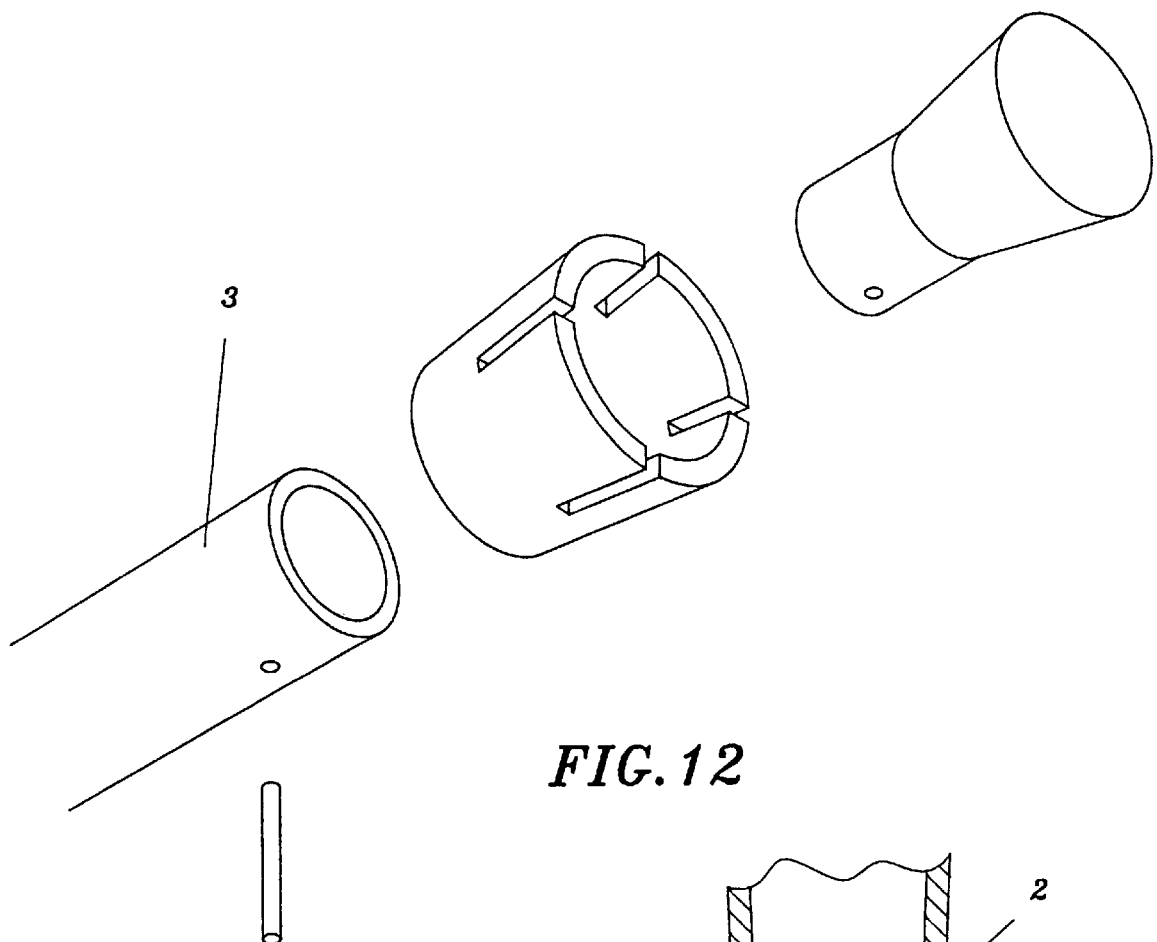
FIG. 12 is an exploded view of a second embodiment of the extension rod.
Figure 13:
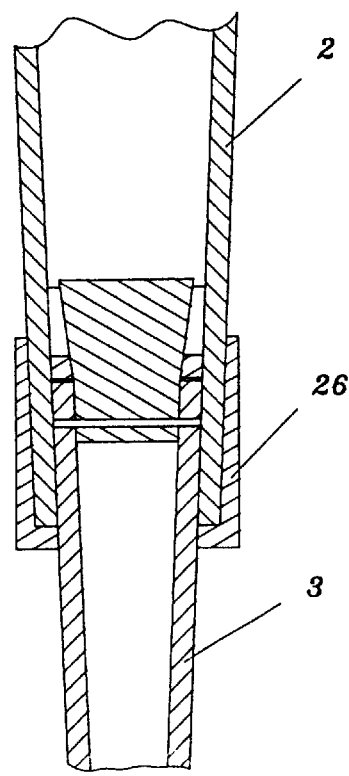
FIG. 13 is a cross sectional view of a second embodiment of the extension rod.

Besides, the connecting portion 30 of the extension rod 3 can be also designed to have a zigzag shape, as shown in FIGS. 10 and 11. In an alternative, it can be also embodied with a taper, as shown in FIGS. 12 and 13. Both can make the extension rod 3 be positioned with respect to the auxiliary rod 2.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

What I claim is:

1. An improved club of the type that includes a main rod 1, an auxiliary rod 2, and an extension rod 3, characterized in that said main rod 1 that has a hollow configuration is enveloped with a threaded collar 11 and a threaded portion 10 at front end, said auxiliary rod 2 being disposed at the front end of the main rod 1 and capable of being completely received within said main rod 1, said auxiliary rod 2 having a taper and hollow configuration, one end of said auxiliary rod 2 being mounted with an expanding socket 21 and a sub-assembly configured by said expanding socket 21 and said auxiliary rod 2 being disposed within said main rod 1, said auxiliary rod 2 being enveloped with a fastening collar 24 and a threaded sleeve 25 and said fastening collar 24 being disposed within said threaded sleeve 25, said threaded sleeve 25 being provided with taper surface 250 and being capable of engaging with said threaded portion 10 of said main rod 1 and locked with said threaded collar 11 such that said auxiliary rod 2 and said main rod 1 can be connected, said auxiliary rod 2 being provided with a positioning portion 20 at the front end and a protecting sleeve 26 at front end to increase the overall rigidity, said extension rod 3 being disposed at front end of said auxiliary rod 2 and being capable of completely received within said auxiliary rod 2, said extension rod 3 having a taper configuration and having a connecting portion 30 at front end such that said auxiliary rod 2 and said extension rod 3 are firmly engaged;

wherein when a club head is attached to the lower end of said extension rod 3, the overall length of said improved club can be readily adjusted to meet the requirements of the user, when said improved club is not in use, said rods can be readily retracted to reduce the overall size for carrying and storing.

2. An improved club as recited in claim 1, said expanding socket 21 of said auxiliary rod 2 is configured by a screw head 210, an expanding portion 211, and a protecting ring 212, said screw head 210 of said expanding socket 21 is fixedly disposed on said auxiliary rod 2, said protecting collar 212 is enveloped onto said expanding portion 211 such that said expanding portion 211 can be protected from collapsing when said screw head 210 is moved into said expanding portion 211.

3. An improved club as recited in claim 1, said expanding socket 4 is configured with a fixing socket 40, a expanding element 41, a pressing element 42, and a locking bolt 43 to position said auxiliary rod 2 with respect to said main rod 1.

4. An improved club as recited in claim 1, wherein said positioning portion 20 of said auxiliary rod 2 has a zigzag shape or a taper means, while said connecting portion 30 of said extension rod 3 is also embodied with a zigzag shape or a taper.

\* \* \* \* \*